United States Patent
Tassitano

(10) Patent No.: US 12,440,183 B2
(45) Date of Patent: Oct. 14, 2025

(54) APPARATUS, SYSTEM, AND METHOD FOR DETECTING THE DISTANCE BETWEEN SENSORS USING ULTRASOUND

(71) Applicant: Avent, Inc., Alpharetta, GA (US)

(72) Inventor: James F. Tassitano, Marietta, GA (US)

(73) Assignee: Avent, Inc., Alpharetta, GA (US)

( * ) Notice: Subject to any disclaimer, the term of this patent is extended or adjusted under 35 U.S.C. 154(b) by 0 days.

(21) Appl. No.: 16/532,550

(22) Filed: Aug. 6, 2019

(65) Prior Publication Data

US 2021/0038185 A1    Feb. 11, 2021

(51) Int. Cl.
| | |
|---|---|
| A61B 8/08 | (2006.01) |
| A61B 5/0538 | (2021.01) |
| A61B 5/06 | (2006.01) |
| A61B 8/12 | (2006.01) |
| A61B 34/20 | (2016.01) |
| A61J 15/00 | (2006.01) |
| A61B 5/285 | (2021.01) |

(52) U.S. Cl.
CPC .......... *A61B 8/0841* (2013.01); *A61B 5/0538* (2013.01); *A61B 5/061* (2013.01); *A61B 8/12* (2013.01); *A61B 34/20* (2016.02); *A61J 15/0003* (2013.01); *A61B 5/285* (2021.01); *A61B 2034/2051* (2016.02)

(58) Field of Classification Search
CPC .......... A61B 8/0841; A61B 5/061; A61B 8/12; A61B 34/20; A61B 5/0538; A61B 5/285; A61B 2034/2051; A61B 2034/2063; A61B 2017/00734; A61B 2017/00221; A61B 2090/372; A61J 15/0003
See application file for complete search history.

(56) References Cited

U.S. PATENT DOCUMENTS

| | | | |
|---|---|---|---|
| 4,836,214 | A | 6/1989 | Sramek |
| 4,921,481 | A | 5/1990 | Danis et al. |
| 6,334,064 | B1 | 12/2001 | Fiddian-Green |

(Continued)

FOREIGN PATENT DOCUMENTS

| | | | | |
|---|---|---|---|---|
| DE | 102018219133 A1 | * | 5/2019 | ............... B81B 3/00 |
| WO | WO 92/17150 | | 10/1992 | |

*Primary Examiner* — Michael J Carey
*Assistant Examiner* — Zainab Mohammed Aldarraji
(74) *Attorney, Agent, or Firm* — Meunier Carlin & Curfman LLC

(57) ABSTRACT

An apparatus, system and method for detecting the distance between a plurality of position detectors using ultrasound includes a processor and a memory device. The system further includes first and second position detector devices each configured to detect the position of a medical device within a patient, the first position detector device including a first transceiver and being operatively coupled to the processor. The second position detector device includes a second transceiver and is operatively coupled to the processor. The first position detector device transmits a signal through the first transceiver and receives a signal from the second position detector device relating to the distance between the first and the second position detector devices. The processor calculates the distance between the first position detector device and the second position detector device. Each transceiver is configured to transmit and receive one or more sound signals in the audio or ultrasonic range.

26 Claims, 4 Drawing Sheets

(56) References Cited

U.S. PATENT DOCUMENTS

| | | | |
|---|---|---|---|
| 6,357,447 B1 | 3/2002 | Swanson et al. | |
| 7,818,155 B2 | 10/2010 | Stuebe et al. | |
| 8,147,486 B2 | 4/2012 | Honour et al. | |
| 8,613,702 B2 | 12/2013 | Feer et al. | |
| 8,986,230 B2 | 3/2015 | Nishtala | |
| 9,179,971 B2 | 11/2015 | Kirschenman | |
| 9,226,878 B2 | 1/2016 | Elia et al. | |
| 9,295,395 B2 | 3/2016 | Elia et al. | |
| 9,532,739 B2 | 1/2017 | Bennett-Guerrero | |
| 9,610,227 B2 | 4/2017 | Elia | |
| 9,642,779 B2 | 5/2017 | Elia et al. | |
| 9,713,579 B2 | 7/2017 | Elia et al. | |
| 10,058,268 B2* | 8/2018 | Besz | A61B 5/6851 |
| 10,398,345 B2* | 9/2019 | Strommer | A61B 5/06 |
| 10,595,821 B1* | 3/2020 | Hamsund | A61B 8/4427 |
| 10,638,972 B2* | 5/2020 | Gollakota | A61B 5/742 |
| 10,754,419 B2* | 8/2020 | Chung | G01S 5/0247 |
| 11,014,623 B2* | 5/2021 | Yun | B60Q 1/085 |
| 2005/0124902 A1* | 6/2005 | Baumer | A61B 7/04 |
| | | | 600/509 |
| 2008/0097179 A1 | 4/2008 | Russo | |
| 2008/0167607 A1 | 7/2008 | Pfeiffer et al. | |
| 2008/0249467 A1 | 10/2008 | Burnett et al. | |
| 2010/0249576 A1* | 9/2010 | Askarinya | A61B 5/6846 |
| | | | 600/424 |
| 2012/0016256 A1 | 1/2012 | Mabary et al. | |
| 2012/0203107 A1* | 8/2012 | Kim | A61B 8/4254 |
| | | | 600/443 |
| 2012/0277619 A1 | 11/2012 | Starkebaum et al. | |
| 2013/0225946 A1 | 8/2013 | Feer et al. | |
| 2013/0245433 A1* | 9/2013 | Deladi | A61B 8/0883 |
| | | | 600/424 |
| 2015/0196229 A1* | 7/2015 | Old | A61B 5/073 |
| | | | 600/302 |
| 2016/0113843 A1 | 4/2016 | Elia et al. | |
| 2016/0129223 A1 | 5/2016 | Kirschenman | |
| 2016/0331298 A1 | 11/2016 | Burnett et al. | |
| 2017/0071502 A1 | 3/2017 | Bennett-Guerrero | |
| 2017/0202750 A1 | 7/2017 | Elia | |
| 2018/0003817 A1* | 1/2018 | Wenus | G01S 15/878 |
| 2018/0078195 A1* | 3/2018 | Sutaria | A61B 5/065 |
| 2018/0117285 A1 | 5/2018 | Shaughnessy et al. | |
| 2018/0143696 A1* | 5/2018 | Chen | G01P 13/00 |
| 2018/0161249 A1 | 6/2018 | Elia et al. | |
| 2018/0289536 A1* | 10/2018 | Burnett | A61B 5/068 |
| 2021/0146039 A1* | 5/2021 | Truong | A61M 5/1452 |

* cited by examiner

APPARATUS, SYSTEM, AND METHOD FOR DETECTING THE DISTANCE BETWEEN SENSORS USING ULTRASOUND

FIELD OF THE INVENTION

The subject matter of the present invention relates generally to an ultrasonic position detector apparatus, system, and method for use with a medical device.

BACKGROUND

Physicians and other health care providers frequently use catheters to treat patients. The known catheters include a tube which is inserted into the human body. Certain catheters are inserted through the patient's nose or mouth for treating the gastrointestinal tract. These catheters, sometimes known as enteral catheters, typically include feeding tubes. The feeding tube lies in the stomach or intestines, and a feeding bag delivers liquid nutrient, liquid medicine or a combination of the two to the patient.

Other types of catheters are inserted into the patient's veins or arteries for treating the cardiovascular system. These intravascular catheters include, among others, central venous catheters, peripheral venous catheters and the peripherally inserted central catheters. These catheters include a relatively small tube that passes through the patient's veins or arteries. Depending on the application, the health care provider can use an intravascular catheter to remove blood vessel blockages, place inserts into blood vessels and provide patients with injections of medications, drugs, fluids, nutrients, or blood products over a period of time, sometimes several weeks or more.

When using these known enteral and intravascular catheters, it is important to place the end of the catheter at the proper location within the human body. Erroneous placement of the catheter tip may injure or harm the patient. For example, if the health care provider erroneously places an enteral catheter into the patient's lungs, liquid may be introduced into the lungs with harmful results. If the health care provider erroneously places an intravascular catheter into the wrong blood vessel of the cardiovascular system, the patient may experience infection, injury or a harmful blockage.

With feeding tubes in particular, it is also prudent to check that the exit aperture of the feeding tube (typically located at the distal end/tip of the tube) remains in its desired location over the period of treatment, e.g., feeding. Protocols that address this requirement in enteral feeding tubes include frequent monitoring for the appropriate pH of fluids extracted from the feeding tube when not carrying nutritional liquids and careful patient monitoring to ensure nutritional uptake is as expected.

In some cases, health care providers use X-ray machines to gather information about the location of catheters within the body. There are several disadvantages with using X-ray machines. For example, these machines are relatively large and heavy, consume a relatively large amount of energy and expose the patient to a relatively high degree of X-ray radiation. Also, these machines are typically not readily accessible for use because, due to their size, they are usually installed in a special X-ray room. This room can be far away from the patient's room. Therefore, health care providers can find it inconvenient to use these machines for performing catheter insertion procedures. Furthermore, it can be inconvenient to transport these machines to a patient's home for home care catheter procedures.

Moreover, even X-rays are not necessarily conclusive as to the location of the catheter tip, as the natural and continuous movement of the internal organs can make it difficult for the physician interpreting the X-ray to be sure of the actual location of the distal end of the catheter.

Another existing catheter locating means involves using an electromagnetic coil positioned inside the catheter and an electromagnetic coil locating receiver outside of the patient's body. The electromagnetic coil is generally incorporated into a stylet or guide wire which is inserted within the catheter. The coil locating receiver can be used to determine the distance the coil is from the receiver and its depth in the patient's body and can communicate with a display to show a reference image of a non-subject body and an image of the coil located on the display with the reference image. However, these systems also have several disadvantages. For example, the coil locating receiver is a large device that must rest in a precise location outside the patient's body and does not permit for adjustments due to each individual patient's anatomical size or shape. However, a patient undergoing a feeding tube placement will be agitated and sudden movements are expected, which can move the coil locating receiver, thus increasing the likelihood of positional errors or complications in locating the catheter. Additionally, these existing systems can only display the coil location over a reference image of a generic patient without reference to the individual patient's particular anatomy. Therefore, health care providers can estimate the positioning of the catheter using the electromagnetic coil and single coil locating receiver but cannot estimate or view the specific patient's anatomy or compensate for any movement of the patient's body or the coil locating receiver.

While recent catheter locating means propose implementing a set of several external electromagnetic coil locating sensors distributed on a patient's body to triangulate the position of the catheter, such a distributed position sensor system requires the relative positions of each electromagnetic coil locating receiver to be known.

Consequently, there is a need for a position detection system that includes a plurality of sensors, i.e., position detectors, that can move dynamically with a target, e.g., a patient. In particular, a position detection system that is capable of determining the relative distance between the position detectors in real-time would be useful.

SUMMARY

The present invention is directed to a medical device position detection system. The system includes a processor, a first position detector device having a sensor configured to detect the position of a medical device within a patient's body, the first position detector device comprising a first transceiver, further wherein the first position detector device is operatively coupled to the processor, and a second position detector device having a sensor configured to detect the position of a medical device within a patient, the second position detector device comprising a second transceiver, further wherein the second position detector device is operatively coupled to the processor. The system further includes a memory device storing instructions which when executed by the processor, cause the processor to: instruct the first position detector device to transmit a sound signal through the first transceiver; receive a signal from the second position detector device relating to the distance between the first position detector device and the second position detector device; and calculate the distance between the first position detector device and the second position detector device.

In one particular embodiment, the system further includes a third position detector device configured to detect the position of a medical device within a patient, the third position detector device including a third transceiver, further wherein the third position detector device is operatively coupled to the processor. Further, when the first position detector device transmits a sound signal through the first transceiver, the processor is configured to receive a signal from the third position detector device relating to the distance between the first position detector device and the third position detector device, and calculate the distance between the first position detector device and the third position detector device.

In another embodiment, each transceiver includes an electromechanical device configured to generate a sound within the audio or ultrasonic range.

In an additional embodiment, the transmitted signal is a sound in the audio or ultrasonic range. Moreover, the processor can be configured to calculate the distance between the first position detector device and the second position detector device based on the time-of-flight of the sound signal from the first transceiver to the second transceiver.

In one more embodiment, the memory device stores additional instructions which when executed by the processor, cause the processor to: instruct the second position detector device to transmit a signal through the second transceiver; receive a signal from the first position detector device relating to the distance between the second position detector device and the first position detector device; and calculate the distance between the second position detector device and the first position detector device. Moreover, the system can further include a third position detector device configured to detect the position of a medical device within a patient, the third position detector device comprising a third transceiver, further wherein the third position detector device is operatively coupled to the processor, further wherein the memory device stores instructions which when executed by the processor, cause the processor to: instruct the third position detector device to transmit a signal through the third transceiver; receive a signal from the first position detector device and/or the second position detector device relating to the distance between the third position detector device and the respective first and/or second position detector device; and calculate the distance between the third position detector device and the respective first and/or second position detector device. Further, when the processor instructs one position detector device to transmit a sound signal through its respective transceiver, the other two position detector devices can both receive the sound signal via the receiver and each sends a signal to the processor relating to the distance between the transmitting position detector device and its respective receiving detector device.

In yet another embodiment, the signal transmitted through the first transceiver is a sound at a frequency in a range from about 5 kilohertz to about 40 kilohertz.

In still another embodiment, each position detector device comprises a housing that is configured to be affixed to a target. Further, each housing can include a covered opening on a top surface of the housing. Moreover, each transceiver can be disposed within the housing of each respective position detector device. Moreover, the sensor of each position detector device can include a receiver unit configured to receive a signal related to the position of the medical device within a patient, wherein the receiver unit is disposed within the housing.

In a further embodiment, each of the position detector devices can further include a wireless communication device configured to communicate wirelessly with the processor.

In an additional embodiment, each of the position detector devices can be configured to communicate with the processor via a wired connection.

In one more embodiment, each position detector device can further include a sound signal receiver on an external surface of the position detector device.

The present invention is also directed to a medical device position detector device. The medical device position detector device includes a transceiver configured to send and receive one or more sound signals, and an electromagnetic signal receiver unit. The transceiver and the electromagnetic signal receiver unit are each configured to be operatively coupled to a processor.

In one particular embodiment, the medical device position detector device can include a housing surrounding the transceiver and the electromagnetic signal receiver unit. Further, the medical device position detector device can include shielding between the transceiver and the electromagnetic signal receiver unit configured to prevent electromagnetic signal interference between the transceiver and the electromagnetic signal receiver unit.

In another embodiment, the medical device position detector device can include a sound signal receiver configured to be operatively coupled to the processor.

The present invention is further directed to a method of determining distances between medical device position detector devices. The method includes steps of: providing a first position detector device having a sensor configured to detect the position of a medical device within a patient's body, the first position detector device comprising a first transceiver, wherein the first position detector device is operatively coupled to a processor; providing a second position detector device having a sensor configured to detect the position of a medical device within a patient, the second position detector device comprising a second transceiver, wherein the second position detector device is operatively coupled to the processor; placing the first position detector device and the second position detector device in a predetermined arrangement on a target; generating a transmission signal via the first transceiver, wherein the transmission signal is received by the second transceiver; sending a signal from the second position detector device to the processor relating to the transmission signal received by the second transceiver; and calculating the distance between the first position detector device and the second position detector device.

In one particular embodiment, the transmission signal is at least one time stamped sound signal configured to be received by the second transceiver of the second position detector, further wherein the second position detector measures the time that the second transceiver receives the transmission signal. Further, the step calculating the distance between the first position detector device and the second position detector device can include the processor calculating the distance between the first position detector device and the second position detector device based on the time-of-flight of the transmission signal.

In another embodiment, the method can further include steps of: providing a third position detector device having a sensor configured to detect the position of a medical device within a patient, the third position detector device comprising a third transceiver, wherein the third position detector device is operatively coupled to the processor; placing the third position detector device in a predetermined arrangement on a target with respect to the first position detector and the second position detector; receiving, at the third ultrasonic transceiver, the transmission signal generated by the first transceiver; sending a signal from the third position detector device to the processor relating to the transmission signal received by the third transceiver; and calculating the distance between the first position detector device and the third position detector device. Moreover, the method can include additional steps of: generating a transmission signal via the second transceiver, wherein the transmission signal is received by the third transceiver; sending a signal from the third position detector device to the processor relating to the transmission signal received by the third ultrasonic transceiver; and calculating the distance between the second position detector device and the third position detector device. In addition, the method can include additional steps of: generating a transmission signal via the third transceiver, wherein the transmission signal is received by the first transceiver and/or the second transceiver; sending a signal from the first position detector device and/or the second position detector device to the processor relating to the received transmission signal; and calculating the distance between the third position detector device and the first position detector device and/or the second position detector device.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
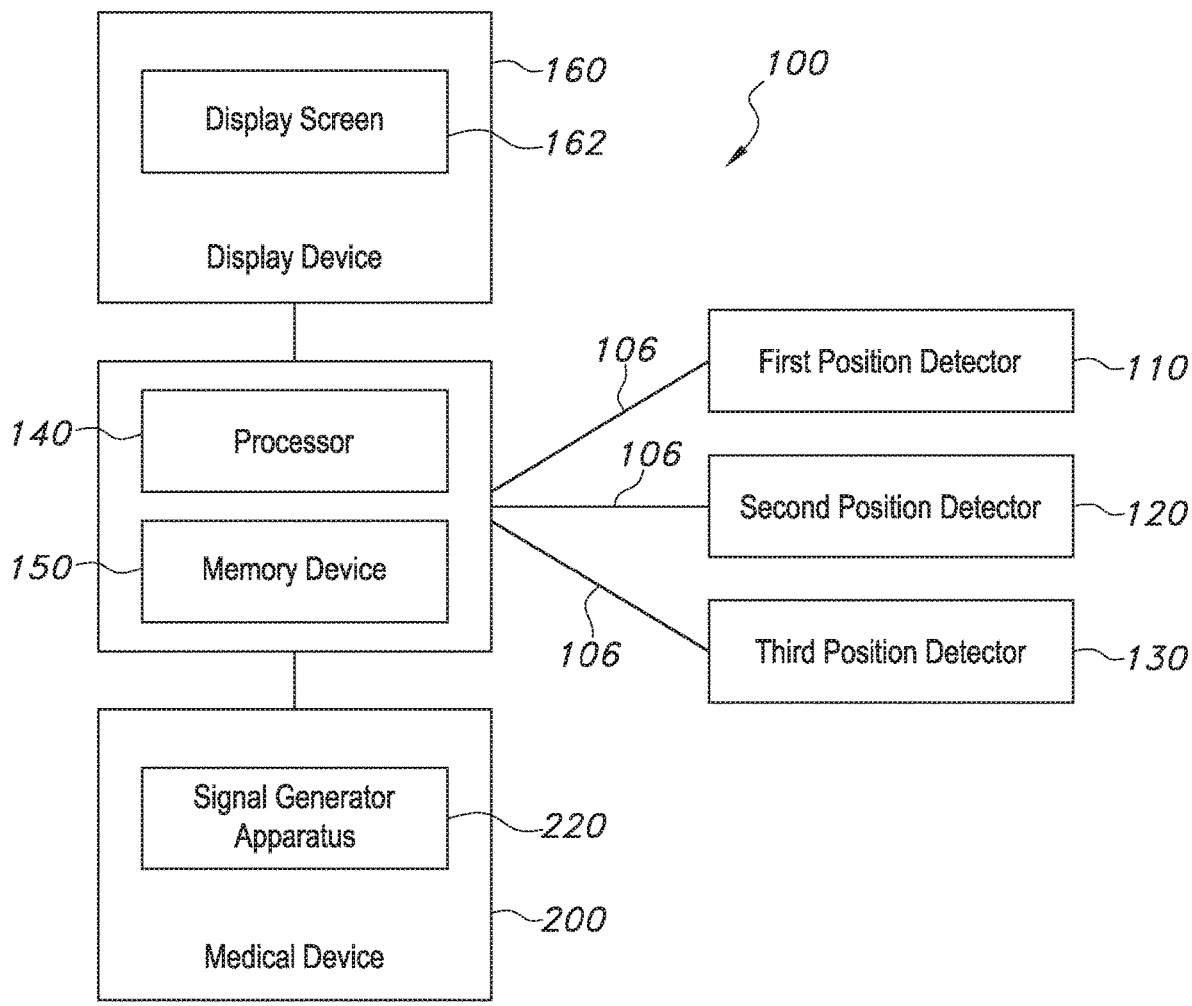
FIG. 1 illustrates a schematic block diagram view of a medical device position guidance system having a plurality of position detectors according to one particular embodiment of the present invention.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "about," "approximately," or "generally," when used to modify a value, indicates that the value can be raised or lowered by 5% and remain within the disclosed embodiment.

Generally speaking, the present invention is directed to a position detection system, i.e., a medical device position detection system. The position detection system includes a processor and a memory device. The position detection system further includes a first position detector device configured to detect the position of a medical device within a patient, the first position detector device comprising a first ultrasonic transceiver, further wherein the first position detector device is operatively coupled to the processor; and a second position detector device configured to detect the position of a medical device within a patient, the second position detector device comprising a second ultrasonic transceiver, further wherein the second position detector device is operatively coupled to the processor. The memory device stores instructions which when executed by the processor, cause the processor to: instruct the first position detector device to transmit a signal through the ultrasonic transceiver; receive a signal from the second position detector device relating to the distance between the first position detector device and the second position detector device; and calculate the distance between the first position detector device and the second position detector device. The present inventors have found that the particular components of the ultrasonic position detection system of the present invention enable the relative distances between each position detector to be easily and quickly measured using the ultrasound time of flight principle, without interfering with each position detector's reception of signals related to determining the position of the medical device. In particular, the present inventors have found that the ultrasonic position detection system of the present invention enables the distances between each position detector to be continuously detected even when one or more position detectors move or are moved out of place. When the relative distance between each position detector placed on a patient's body is known, the system of the present invention uses known correlations between the external anatomy and internal anatomy of a patient to be able to accurately visualize the internal anatomy.

The specific features of the ultrasonic position detection system of the present invention may be better understood with reference to FIGS. 1-5.

Referring now to FIG. 1, one embodiment of a position detection system 100 is shown. The position detection system 100 includes a processor 140 operatively coupled to a medical device 200 and a plurality of position detector devices, e.g., first position detector 110, second position detector 120, and third position detector 130. The position detector devices 110, 120 and 130 are electronically coupled to the processor 140 by a wire, cable, signal data connection, signal carrier or wireless connection. The system 100 further includes a memory device 150 operatively coupled to the processor 140. The plurality of position detectors 110, 120 and 130 each include at least one sensor configured to determine the position of a medical device 200 when it is inserted within a patient 10 by sensing and receiving signals transmitted by the signal generator apparatus 220 of the medical device.

Figure 2:
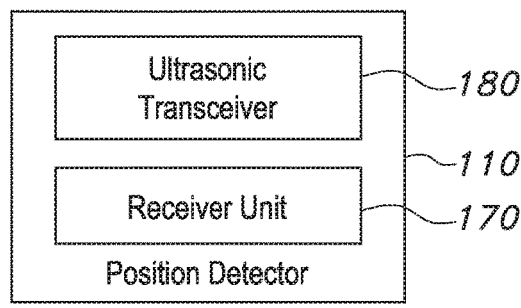
FIG. 2 illustrates a schematic block diagram of a position detector apparatus of the system of FIG. 1.

FIG. 2 shows a block diagram representing the first position detector 110. Although FIG. 2 illustrates the first position detector 110, it should be understood that FIG. 2 is representative of each position detector device, e.g., second position detector 120 and third position detector 130, of the present invention. The first position detector 110 includes a housing 112. Within the housing 112, the first position detector 110 includes a medical device position sensor in the form of a receiver unit 170 that is configured to receive the signals transmitted by the signal generator apparatus 220 of the medical device 200. For instance, in one embodiment, the receiver unit 170 can include at least one inductive coil in which a current is induced when an electromagnetic signal is transmitted by the signal generator apparatus 220 of the medical device 200. The first position detector 110 further includes an ultrasonic transceiver 180 within the housing 112. The first position detector 110 may additionally include shielding (not shown) within the housing 112 between the receiver unit 170 and the ultrasonic transceiver 180. The shielding can prevent signal interference between the receiver unit 170 and the ultrasonic transceiver 180 within the first position detector 110. For example, the shielding can be a barrier between the receiver unit 170 and the ultrasonic transceiver 180 that can be made of conductive or magnetic materials, such as a woven copper shield.

In some aspects of the position detector devices (not shown), each position detector device, e.g., first position detector 110, can have a wireless configuration including a battery and a wireless communication chip configured to communicate with the processor 140. Optionally, the wireless communication chip can include a processor (not shown). The wireless communication chip can be any suitable form of wireless communication capable of sending and receiving digital signals from the processor 140.

Figure 3:
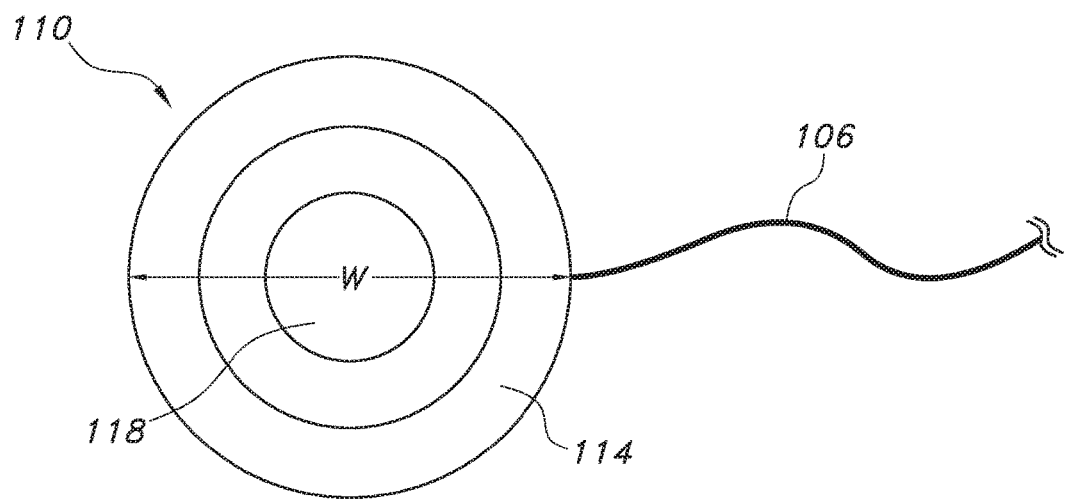
FIG. 3 illustrates a top view of a position detector apparatus of the present invention.
Figure 4:
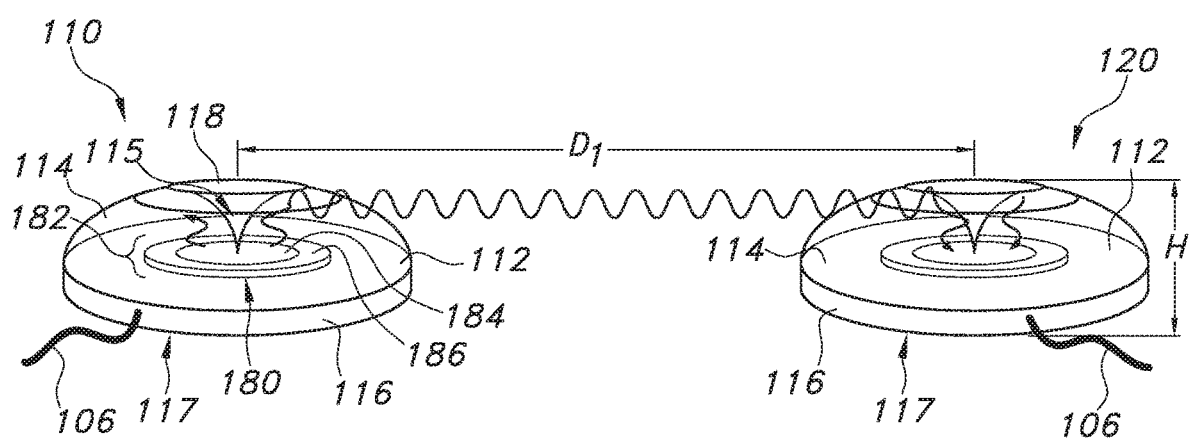
FIG. 4 illustrates a side view of two position detector apparatuses in use to determine the distance between the two position detector apparatuses.

As illustrated in FIGS. 3-4, each of the position detector devices, e.g., first position detector 110, includes a housing 112 surrounding the receiver unit 170 and the ultrasonic transceiver 180. The housing 112 can include at least an upper surface 114 and a lower surface 116. The upper surface 114 can include an opening 115 having a cover 118 through which sound waves, e.g., ultrasonic waves, can penetrate. As shown in FIGS. 3-4, the lower surface 116 can be circular or oval in shape, and the upper surface 114 together with the cover 118 of the covered opening 115 can be generally semi-spherical shaped such that the overall shape of the housing 112 forms a dome shape. However, the external shape of the housing 112 of each position detector is of little consequence so long as the opening 115 covered by the cover 118 can allow the penetration of sound waves therethrough. As such, the housing 112 can have any other suitable external shape based on a particular application of the position detection system 100. As shown in FIGS. 3 and 4, a conductive wire or data cable 106 can extend from the housing 112 of the position detector 110.

The housing 112 of each position detector device, e.g., first position detector 110, can have a footprint (i.e., shape and size of the lower surface 116) that is generally comparable to standard electrocardiogram leads. For example, the housing 112 can have a diameter or width W extending across the widest portion of the lower surface 116 that is in a range from about 0.5 inches (1.25 cm) to about 5 inches (13 cm), or any value or range therebetween, such as from about 1 inch (2.5 cm) to about 3 inches (7.6 cm), for example from about 1.5 inches (3.8 cm) to about 2.5 inches (6.4 cm).

The housing 112 can have a height H in a range from about 0.25 inches (0.63 cm) to about 2 inches (5.1 cm), or any value or range therebetween, such as from 0.3 inches (0.76 cm) to about 1 inch (2.5 cm), for example about 0.5 inches (1.25 cm). In addition, each of the position detector devices, e.g., first position detector 110, can be lightweight.

As shown in FIGS. 3 and 4, each position detector device, e.g., first position detector 110, can further include a fixation mechanism 117 that is configured to affix the position detector device to a target. In some aspects, the target can be a human body, e.g., a patient in a health care setting, or a garment worn by a person. However, the target can be any object or animal with which the size and shape of the target is intended to be measured using the system 100 of the present invention. In one aspect, the position detector device can be directly affixed to the target by the fixation mechanism 117 so that the position detector maintains a fixed reference point in relation to the target. Thus, if/when the target moves, the position detector device moves with the target to maintain a static frame of reference with respect to the particular target. The fixation mechanism 117 can be positioned on the lower surface 116 of the housing 112. For example, the fixation mechanism 117 can include an adhesive material that is configured to affix the housing 112 of the position detector device to the target. In some aspects, the adhesive material may be suitable to adhere the housing 112 to the skin of a patient, a patch disposed on a patient's body, or a garment. The adhesive material can be an adhesive substrate that can be adhesive on both sides such that it adheres to the lower surface 116 of the housing 112 on one side and to the target on the other side. When the fixation mechanism 117 is adhesive material adhered to the lower surface 116 of the housing 112, the position detector device can additionally include a peelable protective sheet (not shown) covering the entire adhesive material 117. The peelable protective sheet can be removed prior to affixing the adhesive to the target. Optionally, a used adhesive substrate can be removed from the housing 112 and discarded, and a new adhesive substrate can be applied. Alternatively, the adhesive material can be any suitable adhesive arrangement which is capable of releasably adhering the housing 112 to the target. In other embodiments, the fixation mechanism 117 can include a clip, pin, magnet, hook and loop system, or any other suitable means for affixing the position detector to a target. By using a fixation mechanism 117 on each position detector device that can affix the position detector device to target, the frame of reference of each position detector device can remain stationary with the subject's body. Thus, the likelihood of positional errors when using the position detection system 100 in a health care setting can be reduced as compared to other medical device guidance systems because there can be fewer complications arising due to movement a target patient's body.

Turning now to FIG. 4, as described above, each position detector, e.g., first position detector 110, includes an audio and/or ultrasonic transceiver 180. The transceiver 180 includes an transducer 182 that is configured to both transmit and receive sound at an audio and/or ultrasound frequency. The audio frequency range for humans is from 20 Hz to about 20 kHz, and frequencies greater than about 20 kHz are ultrasound frequencies. The transducer 182 converts alternating current (AC) into sound of an audio and/or ultrasound frequency, as well as the reverse. The transducer 182 can be any electromechanical device capable of generating a sound in the audible or ultrasonic range, such as a piezoelectric transducer or a capacitive transducer. FIG. 4 illustrates a capacitive transducer 182 having a conductive diaphragm 184 disposed over a backing plate 186. The capacitive transducer 182 uses electrostatic fields between the conductive diaphragm 184 and the backing plate 186 to convert AC into audio and/or ultrasound, or to convert received audio and/or ultrasound into AC. The transducer 182 is in operative communication with the processor 120 via the conductive wire or data cable 106 extending into the housing 112.

When a plurality of position detectors of the present invention, e.g., first position detector 110 and second position detector 120 as shown in FIG. 4, are disposed in proximity to each other, their respective transceivers 180 can be used to determine the relative distance between the first position detector 110 and the second position detector 120. For instance, the processor 140 can send at least one time-stamped signal, e.g., at least one or a series of signals in the form of alternating current (AC), at a known frequency to the transceiver 180 of the first position detector 110. By "time-stamped," the present invention contemplates recording the precise time that each respective signal is sent from the processor 140 to the transceiver 180 of the first position detector 110. In this manner, it will be known at what time the transceiver 180 of the first position detector 110 generates an audio and/or ultrasound signal at the known frequency. The AC generates an electrostatic field between the conductive diaphragm 184 and the backing plate 186 to generate audio and/or ultrasound at the known frequency. The transceiver 180 of the second position detector 120 receives the audio and/or ultrasound signal that was generated from the first position detector 110 and measures the time that the signal was received. The second position detector 120 then sends a signal back to the processor 140 containing information regarding the time the audio and/or ultrasound signal was received. Thus, the processor 140, executing algorithms stored in the memory device 150, processes the signal received from the second position detector 120 to calculate the "time-of-flight" of the audio and/or ultrasound generated by the first position detector 110. Stated another way, using the known time stamp of the audio and/or ultrasound signal generated by the first position detector 110 and the time stamp that the second position detector 120 received the audio and/or ultrasound signal that was generated by the first position detector 110, the processor 140 can determine the transit time of the audio and/or ultrasound signal between the first position detector 110 and the second position detector 120. Using the "time-of-flight" of the audio and/or ultrasound signal generated by the first position detector 110, along with the speed of sound of the medium (i.e., air at the temperature of the room or other environment in which the system 100 is used) between the transducers 182, the processor 140 then mathematically converts the time-of-flight or transit time to the distance D1 between the transceiver 180 of the first position detector 110 and the transceiver 180 of the second position detector 120. The speed of sound in air at a temperature of 68° F. (20° C.) is generally known to be about 343 meters per second, i.e., about 1,125 feet per second. Optionally, the system 100 may include a temperature sensor (not shown) to determine the air temperature in the environment in which the system 100 is used in order to more accurately determine the distance D1.

Figure 5:
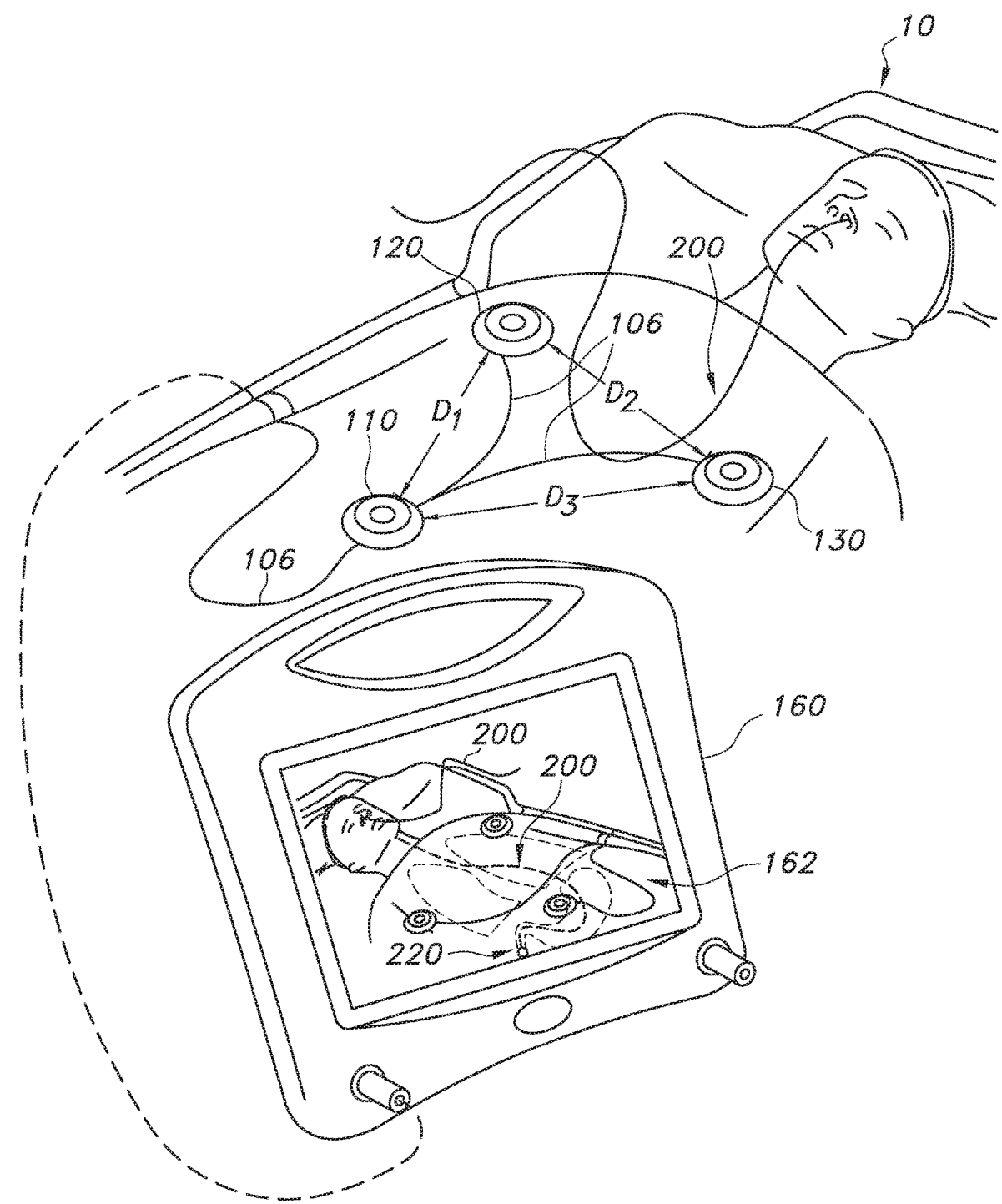
FIG. 5 illustrates a perspective view of the system of FIG. 1 in use with a medical device inserted into a patient's body.

The signal generated by each ultrasonic transceiver 180 of the present invention is generally understood to be an audio frequency or low frequency ultrasound. Ultrasound is not different from "normal" (audible) sound in its physical properties, except that humans cannot hear it. The lower limit of the ultrasound range is approximately 20 kHz (20,000 hertz) in healthy young adults. The frequency generated by the transceivers 180 of the present invention is in a range from about 5 kHz to about 100 kHz, such as from about 7 kHz to about 50 kHz, for example from about 10 kHz to about 40 kHz. In one particular example of the present invention, an audio frequency sound of about 10 KHz is used. The present inventor has found that audio frequency sound, for example, about 10 KHz, is particularly advantageous because such audio frequency sound is less directional than higher frequencies and will penetrate surfaces such as clothing more easily. These advantages are particularly important for the use of the position detectors of the present invention because the position detectors are configured to be spread out on or around a patient's body, as shown in FIG. 5, in various directions, such that the transmission of audio frequency sound in all directions and through soft surfaces such as clothing is necessary for the system 100 to properly measure the distances between each of the position detectors. Note that even lower frequencies in the audible range, such as about 5 kHz, can be used.

In order to mitigate the effect of having a continuous high frequency audio sound, a pulsing technique can be used. A series of pulses, i.e., AC signals, are sent to the transducer 180. For instance, the series of pulses can include from 3 pulses to 30 pulses, for example from 5 pulses to 20 pulses, for example from 8 to 10 pulses. Then, the transceiver 180 of the position detector 110 is turned off for a time interval of from about 0.5 seconds to about 2 seconds, for example, about 1 second. The time interval that the transceiver 180 of the position detector 110 is turned off can be varied depending on how often a positional update is required. As a result of the series of pulsed signals, the perceived sound generated by the transceiver 180 is an audible click instead of a continuous tone.

Using the process described above, at an ultrasound frequency of about 25 kHz, the distance D1 between the first position detector 110 and the second position detector 120, or more precisely, the distance between the ultrasonic transceiver 180 of the first position detector 110 and the ultrasonic transceiver 180 of the second position detector 120, can be calculated accurately to within several millimeters, such as accurate to within about 1 millimeter. The nominal accuracy is determined by several factors, including the signal amplitude and frequency of the audio or ultrasound signal. With lower frequencies, the electronics required to measure time of flight require more precise timing. It has been determined that at the audible frequency of 10 KHz, an accuracy of 4 millimeters can be achieved. As frequency increases, the achievable accuracy improves. For example, an ultrasound signal of 25 kHz can achieve an accuracy of about 2 mm, and an ultrasound signal of 40 kHz can achieve an accuracy of about 1 mm at 40 KHz, so long as there is an unobstructed view between the transceiver units. However, there is a tradeoff between the frequency of the signal and the directionality of the signal. For instance, the higher the frequency, the more directional the signal and the more susceptible to interference. Thus, using a signal frequency such as 10 kHz or 25 kHz in the present invention enables position detection with an acceptable accuracy of from about 2 to 4 millimeters while still being a low enough frequency to be able to penetrate through clothing and other obstacles, thereby reducing the likelihood of interference with the generated signals.

The "time-of-flight" technique described above is used in the system 100 of the present invention to determine the relative distance between each of the position detectors 110, 120 and 130. For instance, to confirm the distance D1 between the first position detector 110 and the second position detector 120, the processor 140 can direct the ultrasound transceiver 180 of the second position detector 120 to generate an ultrasound signal that is then received by the ultrasound transceiver 180 of the first position detector 110. Thus, the system 100 of the present invention is configured to substantiate and confirm the distances between each of the position detectors.

As shown in FIGS. 1 and 5, the system 100 of the present invention can include a first position detector 110, a second position detector 120, and a third position detector 130. The distance between the first position detector 110 and the second position detector 120 is shown in both FIG. 4 and FIG. 5 as D1; the distance between the second position detector 120 and the third position detector 10 is shown as D2 in FIG. 5; and the distance between the first position detector 110 and the third position detector 130 is shown as D3 in FIG. 5. The "time-of-flight" technique described above is used to determine each of the relative distances D1, D2 and D3 as set forth above. When one position detector, e.g., the first position detector 110, transmits an ultrasound signal as described above, both the second position detector 120 and the third position detector 130 can receive the transmitted ultrasound signal such that both distances D1 and D3 can be measured at the same time when the first position detector 110 transmits the ultrasound signal. Similarly, when the second position detector 120, transmits an ultrasound signal, both the first position detector 110 and the third position detector 130 can receive the transmitted ultrasound signal such that both distances D1 and D2 can be measured at the same time, and when the third position detector 130 transmits the ultrasound signal, both the first position detector 110 and the second position detector 10 can receive the transmitted ultrasound signal such that both distances D3 and D2 can be measured at the same time.

By implementing three position detectors, the system 100 can respectively triangulate the relative position of each of the position detectors 110, 120 and 130, and additionally can triangulate the position of the medical device 200 using the respective receiver units 170 of each of the position detectors 110, 120 and 130.

The system 100 of the present invention may be used to determine the position of a medical device 200 inserted within a patient 10, e.g., an enteral feeding catheter 200 as shown in FIG. 5. In use, the processor 140 instructs a signal generator apparatus 220 of the medical device 200 to transmit a signal related to the position of the medical device 200. The receiver unit 170 of each of the position detectors 110, 120 and 130 is a sensor that is configured to receive the signal that is transmitted by the signal generator apparatus 220 of the medical device 200. Each receiver unit 170 then sends information about the received signal back to the processor 140. The processor 140 can then process the information received from the receiver unit 170 of each position detector to determine the position of the medical device 200 relative to each position detector.

For instance, in one aspect, the signal generator apparatus 220 can include a high frequency voltage drive generator connected to a conductive coil that is configured to generate an electromagnetic field. The corresponding receiver units 170 within each position detector 110, 120 and 130 can include at least one inductive coil in which a current is induced by the electromagnetic field generated by the signal generator apparatus 220. Then, each receiver unit 170 can send information containing the strength of the induced current to the processor 140. These induced signals are converted to signals that can be provided to the processor 140, which assesses from these signals and the drive signals provided to the high frequency coil drive voltage generator the distance and the relative angular position between the coil of the signal generator apparatus 220 from which the voltage was generated and the coils of each receiver unit 170 in which the voltage was induced. However, any other suitable signal generator and complementary sensor or signal receiver can be used for the signal generator apparatus 220 of the medical device 200 and the receiver unit 170 of each position detector, respectively, so long as the relative distance between the signal generator apparatus 220 and the receiver unit 170 of each position detector 110, 120 and 130 can be determined.

As described above, by determining the relative position of the medical device 200 relative to each of three position detectors 110, 120 and 130, the actual position of the medical device 200 in three dimensions (i.e., the x, y and z axes) with respect to the patient's anatomy can be determined. Moreover, when the relative location of the position detectors 110, 120 and 130 is known, e.g., when the position detectors are placed on a patient of the patient 10 in a predetermined arrangement known anatomical landmarks on the body 10, the position detectors 110, 120 and 130 can provide a known anatomical frame of reference which can enable anthropometric data to be applied in order to approximate three-dimensional locations and sizes of internal anatomical structures. For instance, one position detector, e.g., the second position detector 120, can be placed at a right upper landmark, such as the right midclavicular line, one position detector, e.g., the second position detector 130, can be placed at a left upper landmark, such as the left midclavicular line, and one position detector, e.g., the first position detector 110, can be placed at a central landmark, such as the xiphoid process. As illustrated in FIG. 5, the xiphoid process is the cartilaginous section at the lower end of the sternum which is generally positioned along a mid-sagittal line of the patient 10 and which is not attached to any ribs and is gradually ossified in adult humans. The right and left midclavicular lines are each imaginary lines which are generally parallel to the mid-sagittal line and pass downwards over the trunk of the human body 10 through the midpoint of the right and left clavicle bones, respectively. However, the midclavicular lines and the xyphoid process are not the only landmarks that could be used for this purpose. There may be other points of the body to which the predetermined arrangement of the plurality of position detectors 110, 120 and 130 could be reliably co-located or located with a predetermined offset for use in a reliable medical device position guidance system.

Thus, as shown in FIG. 5, when the system 100 of the present invention is used to determine the position of a medical device 200 inserted in a patient's body 10, the information gathered by the processor 140 can be processed and displayed on a display screen 162 of a display device 160. For example, as illustrated in FIG. 5, the display device 160 can display the position of the medical device 200 relative to the patient's organs (e.g., esophagus, stomach, small intestine, lungs, etc.) in real-time and in-scale with the patient's anatomy. Therefore, the system 100 of the present invention enables the real-time guidance of the insertion of a medical device 200 within a patient 10 in order to ensure the medical device 200 is not improperly inserted.

Figure 6:
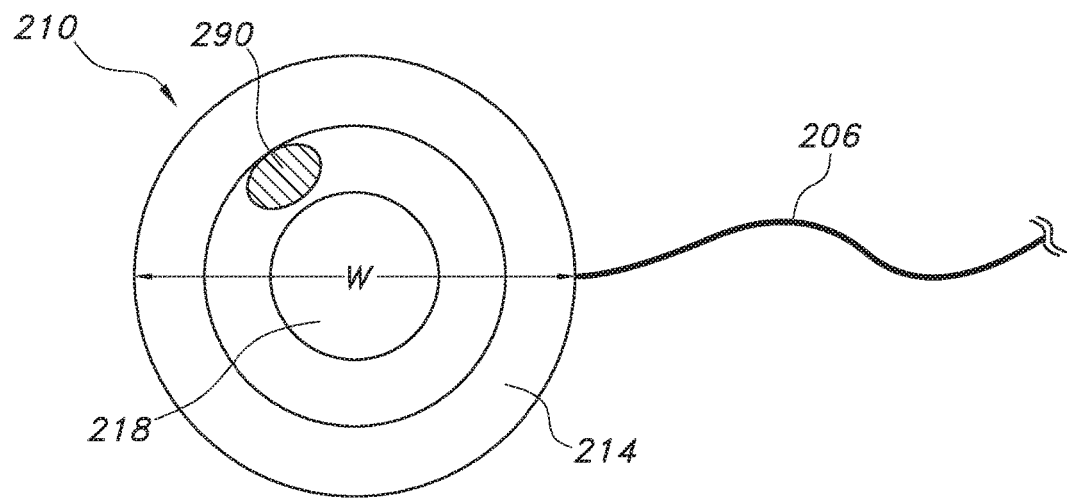
FIG. 6 illustrates a top view of a position detector apparatus according to another embodiment of the present invention.
Figure 7:
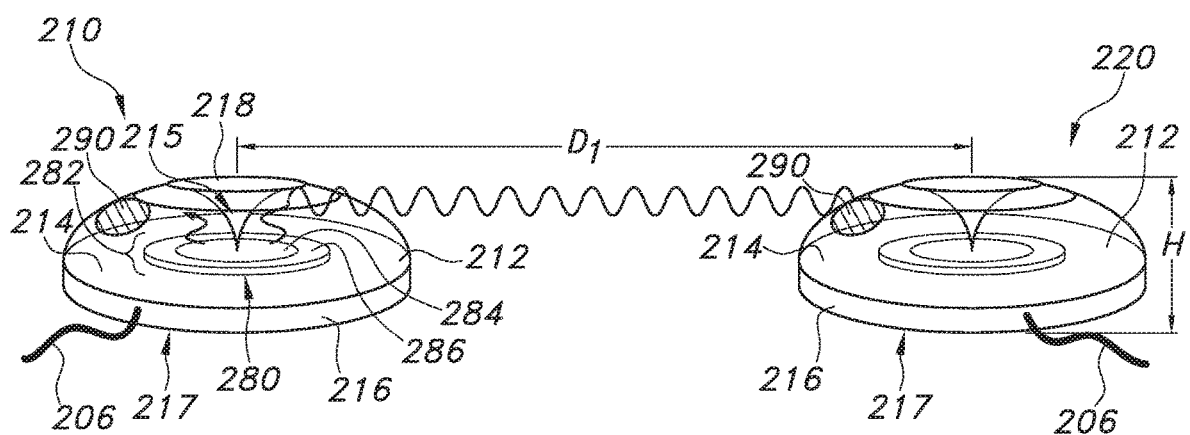
FIG. 7 illustrates a side view of two position detector apparatuses of FIG. 6 in use to determine the distance between the two position detector apparatuses.

In another aspect of the invention as shown in FIGS. 6-7, each position detector, e.g., position detector 210, can have a separate ultrasonic transducer 280 configured to generate an audio or ultrasonic signal and a microphone 290 configured to receive the audio or ultrasonic signal. Similar to the position detector 110 shown in FIGS. 3-4, the position detector 210, includes a housing 212 surrounding the receiver unit (not shown) and the ultrasonic transducer 280, and further includes the microphone 290 on an upper surface 214 of the housing 212. The housing 212 further includes a lower surface 216. The upper surface 214 can include an opening 215 having a cover 218 through which sound waves, e.g., ultrasonic waves, can penetrate. As shown in FIGS. 6-7, a conductive wire or data cable 206 can extend from the housing 212 of the position detector 210. As shown in FIGS. 6-7, each position detector device, e.g., position detector 210, can further include a fixation mechanism 217 that is configured to affix the position detector device to a target.

Turning now to FIG. 7, as described above, each position detector, e.g., position detector 210, includes an ultrasonic transducer unit 280. The ultrasonic transducer unit 280 includes an ultrasonic transducer 282 that is configured to transmit ultrasound. The ultrasonic transducer 282 converts alternating current (AC) into ultrasound, as well as the reverse. The ultrasonic transducer 282 can be either a piezoelectric transducer or a capacitive transducer. FIG. 7 illustrates a capacitive ultrasonic transducer 282 having a conductive diaphragm 284 disposed over a backing plate 286. The capacitive ultrasonic transducer 282 uses electrostatic fields between the conductive diaphragm 284 and the backing plate 286 to convert AC into ultrasound, or to convert received ultrasound into AC. The ultrasonic transducer 282 is in operative communication with the processor 120 via the conductive wire or data cable 206 extending into the housing 212. Each position detector 210 further includes a separate audio or ultrasonic receiver 290, e.g., in the form of a microphone, on the upper surface 214 of the housing 212. The audio or ultrasonic receiver 290 can be a piezoelectric receiver, a capacitive receiver, a MEMS receiver, or any other device capable of receiving the audio or ultrasonic frequency generated by the ultrasonic transducer unit 280. Thus, when an audio or ultrasonic signal is generated by the transducer unit 280 of the position detector 210, the audio or ultrasonic receiver 290 of a cooperating position detector 220 is configured to receive the audio or ultrasonic signal in order to determine the distance D1 between the position detector 210 and the position detector 220, as described above.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A medical device position detection system comprising:
   a processor;
   a first position detector device having a first sensor configured to detect the position of a medical device within a patient's body, the first position detector device comprising a first sound transceiver, further wherein the first position detector device is operatively coupled to the processor;
   a first housing, wherein the first position detector device is disposed in the first housing;
   a first electromagnetic shield within the first housing between the first sensor and the first sound transceiver;
   a second position detector device having a second sensor configured to detect the position of the medical device within a patient's body, the second position detector device comprising a second sound transceiver, further wherein the second position detector device is operatively coupled to the processor;
   a second housing, wherein the second position detector device is disposed in the second housing;
   wherein the first housing and the second housing each comprise a lower surface having a fixation mechanism and an upper surface having an opening therethrough and a cover covering the opening through which sound waves may penetrate; and
   a memory device storing instructions which when executed by the processor, cause the processor to:
   (i) instruct the first position detector device to transmit a first sound signal through the first sound transceiver;
   (ii) receive the first sound signal from the second position detector device relating to a distance between the first position detector device and the second position detector device; and
   (iii) calculate the distance between the first position detector device and the second position detector device;
   wherein the memory device stores additional instructions which when executed by the processor, cause the processor to:
   (iv) instruct the second position detector device to transmit a second sound signal through the second sound transceiver;
   (v) receive the second sound signal from the first position detector device relating to a distance between the second position detector device and the first position detector device; and
   (vi) calculate the distance between the second position detector device and the first position detector device;
   wherein the first sound signal transmitted through the first sound transceiver is at a frequency in a range from about 5 kilohertz to about 40 kilohertz.

2. The medical device position detection system of claim 1, further comprising a third position detector device configured to detect the position of the medical device within a patient, the third position detector device comprising a third sound transceiver, further wherein the third position detector device is operatively coupled to the processor.

3. The medical device position detection system of claim 2, wherein when the first position detector device transmits a sound signal through the first sound transceiver, the processor is configured to receive a signal from the third position detector device relating to the distance between the first position detector device and the third position detector device, and calculate the distance between the first position detector device and the third position detector device.

4. The medical device position detection system of claim 1, wherein each transceiver comprises an electromechanical device having a conductive diaphragm configured to generate a sound within an audio range or ultrasonic range; and
   wherein the first sound signal includes a series of pulses that produce at least one audible click.

5. The medical device position detection system of claim 1, wherein the processor is configured to calculate the distance between the first position detector device and the second position detector device based on a time-of-flight of the first sound signal from the first sound transceiver to the second sound transceiver and a time-of-flight of the second sound signal from the second sound transceiver to the first sound transceiver.

6. The medical device position detection system of claim 1, wherein the system further comprises a third position detector device configured to detect the position of a medical device within a patient, the third position detector device comprising a third transceiver, further wherein the third position detector device is operatively coupled to the processor, further wherein the memory device stores instructions which when executed by the processor, cause the processor to:
   (i) instruct the third position detector device to transmit a signal through the third transceiver;
   (ii) receive a signal from the first position detector device and/or the second position detector device relating to the distance between the third position detector device and the respective first and/or second position detector device;
   (iii) calculate the distance between the third position detector device and the respective first and/or second position detector device; and
   (iv) triangulate the relative position of the medical device within the patient's body using the first sensor of the first position detector device, the second sensor of the second position detector device, and the third sensor of the third position detector device.

7. The medical device position detection system of claim 6, wherein when the processor instructs one position detector device to transmit a sound signal through its respective transceiver, the other two position detector devices both receive the sound signal via the receiver and each sends a signal to the processor relating to the distance between the transmitting position detector device and its respective receiving detector device.

8. The medical device position detection system of claim 1, wherein the first housing and the second housing are each configured to be affixed to a target; and
   wherein the cover of each housing through which sound waves may penetrate covers an opening on a top surface of each respective housing.

9. The medical device position detection system of claim 1,
   wherein the first housing and the second housing are each configured to be affixed to a target; and
   wherein each transceiver is disposed within the respective housing of each respective position detector device.

10. The medical device position detection system of claim 1,
    wherein the first housing and the second housing are each configured to be affixed to a target; and
    wherein the sensor of each position detector device comprises a receiver unit configured to receive a signal related to the position of the medical device within a patient, wherein the receiver unit is disposed within the respective housing.

11. The medical device position detection system of claim 1, wherein each of the position detector devices further comprises a wireless communication device configured to communicate wirelessly with the processor.

12. The medical device position detection system of claim 1, wherein each of the position detector devices is configured to communicate with the processor via a wired connection.

13. The medical device position detection system of claim 1, wherein each position detector device further comprises a sound signal receiver on an external upper surface of the housing of the position detector device.

14. A medical device position detector device comprising:
    a first sound transceiver configured to send and receive one or more sound signals at a frequency in a range from about 5 kilohertz to about 40 kilohertz to or from a second sound transceiver; and
    a first electromagnetic signal receiver unit configured to receive an electromagnetic signal from a medical device comprising an electromagnetic signal generator; and
    shielding between the transceiver and the electromagnetic signal receiver unit configured to prevent electromagnetic signal interference between the transceiver and the electromagnetic signal receiver unit;
    wherein the first sound transceiver and the first electromagnetic signal receiver unit are each configured to be operatively coupled to a processor;
    wherein the first sound transceiver is disposed within a first housing, wherein the first housing comprises a lower surface having a fixation mechanism and an upper surface having an opening therethrough and a first cover covering the opening through which sound waves may penetrate.

15. The medical device position detector device of claim 14, further comprising wherein the first housing surrounds the first sound transceiver and the first electromagnetic signal receiver unit.

16. The medical device position detector device of claim 14, further comprising a sound signal receiver configured to be operatively coupled to the processor and provided on the upper surface of the housing.

17. A method of determining distances between medical device position detector devices, the method comprising steps of:
    providing a first position detector device having a first sensor configured to detect the position of a medical device within a patient's body, the first position detector device comprising a first sound transceiver, wherein the first position detector device is operatively coupled to a processor, further wherein the first position detector device is disposed in a first housing, and wherein a first electromagnetic shield is within the first housing between the first sensor and the first sound transceiver;
    providing a second position detector device having a second sensor configured to detect the position of a medical device within a patient, the second position detector device comprising a second sound transceiver, wherein the second position detector device is operatively coupled to the processor, further wherein the second position detector device is disposed in a second housing, wherein the first housing and the second housing each comprise a lower surface having a fixation mechanism and an upper surface having an opening therethrough and a cover covering the opening through which sound waves may penetrate;
    placing the first position detector device and the second position detector device in a predetermined arrangement on a target;
    generating a transmission signal via the first sound transceiver, wherein the transmission signal is a sound at a frequency in a range from about 5 kilohertz to about 40 kilohertz, wherein the transmission signal is received by the second sound transceiver;
    sending a signal from the second position detector device to the processor relating to the transmission signal received by the second sound transceiver;

calculating the distance between the first position detector device and the second position detector device;

generating a transmission signal via the second sound transceiver, wherein the transmission signal is received by the first sound transceiver;

sending a signal from the first position detector device to the processor relating to the transmission signal received by the first sound transceiver; and calculating the distance between the second position detector device and the first position detector device.

18. The method of claim 17, wherein the transmission signal is at least one time stamped sound signal configured to be received by the second sound transceiver of the second position detector, further wherein the second position detector measures the time that the second sound transceiver receives the transmission signal.

19. The method of claim 18, wherein the step calculating the distance between the first position detector device and the second position detector device comprises the processor calculating the distance between the first position detector device and the second position detector device based on the time-of-flight of the transmission signal.

20. The method of claim 17, further comprising steps of:
providing a third position detector device having a third sensor configured to detect the position of a medical device within a patient, the third position detector device comprising a third sound transceiver, wherein the third position detector device is operatively coupled to the processor;

placing the third position detector device in a predetermined arrangement on a target with respect to the first position detector and the second position detector;

receiving, at the third sound transceiver, the transmission signal generated by the first sound transceiver;

sending a signal from the third position detector device to the processor relating to the transmission signal received by the third sound transceiver; and calculating the distance between the first position detector device and the third position detector device.

21. The method of claim 20, further comprising steps of:
generating a transmission signal via the second sound transceiver, wherein the transmission signal is received by the third sound transceiver;

sending a signal from the third position detector device to the processor relating to the transmission signal received by the third sound transceiver; and calculating the distance between the second position detector device and the third position detector device.

22. The method of claim 20, further comprising steps of:
generating a transmission signal via the third sound transceiver, wherein the transmission signal is received by the first sound transceiver and/or the second sound transceiver;

sending a signal from the first position detector device and/or the second position detector device to the processor relating to the received transmission signal; and calculating the distance between the third position detector device and the first position detector device and/or the second position detector device.

23. The medical device position detection system of claim 1, further comprising an air temperature sensor configured to determine an air temperature; and
wherein the memory device stores additional instructions which when executed by the processor, cause the processor to:
determine the speed of sound of the air between the first sound transceiver and the second sound transceiver based on the air temperature.

24. The medical device position detection system of claim 1, further comprising a first sound receiver on an upper surface of the first housing.

25. The medical device position detection system of claim 1, wherein the first sensor comprises a first inductive coil and the second sensor comprises a second inductive coil, wherein the first inductive coil and the second inductive coil are configured to receive signals from the medical device within the patient's body.

26. The medical device position detection system of claim 1, wherein the cover comprises a conical diffuser configured to direct the first sound signal of the first sound transceiver.

* * * * *